(12) United States Patent
Wang et al.

(10) Patent No.: US 10,762,334 B2
(45) Date of Patent: Sep. 1, 2020

(54) SYSTEM AND METHOD FOR ENTITY RECOGNITION

(71) Applicant: Alibaba Group Holding Limited, George Town, Grand Cayman (KY)

(72) Inventors: Yan Wang, Beijing (CN); Xuetao Feng, Beijing (CN)

(73) Assignee: Alibaba Group Holding Limited, George Town (KY)

(*) Notice: Subject to any disclaimer, the term of this patent is extended or adjusted under 35 U.S.C. 154(b) by 88 days.

(21) Appl. No.: 16/134,665

(22) Filed: Sep. 18, 2018

(65) Prior Publication Data
US 2019/0102608 A1   Apr. 4, 2019

(30) Foreign Application Priority Data

Sep. 29, 2017   (CN) .......................... 2017 1 0909942

(51) Int. Cl.
*G06K 9/00*           (2006.01)
*H04N 5/235*          (2006.01)
(Continued)

(52) U.S. Cl.
CPC ..... *G06K 9/00281* (2013.01); *G06K 9/00288* (2013.01); *G06K 9/00671* (2013.01); *G06K 9/00906* (2013.01); *G06T 7/11* (2017.01); *G06T 7/97* (2017.01); *H04N 5/2354* (2013.01); *H04N 5/23219* (2013.01); *H04N 5/23222* (2013.01);
(Continued)

(58) Field of Classification Search
CPC ........... G06K 9/00281; G06K 9/00288; G06K 9/00906; G06K 9/00671; G06K 9/00684; H04N 5/23222; H04N 5/23219; H04N 5/2354; H04N 5/23299; G06T 7/97;
(Continued)

(56) References Cited

U.S. PATENT DOCUMENTS 8,180,629 B2    5/2012  Rehberg
9,607,138 B1 *  3/2017  Baldwin ................. G06F 21/32
(Continued)

FOREIGN PATENT DOCUMENTS

WO   2017059576   4/2017
WO   2018055340   3/2018

OTHER PUBLICATIONS

Hyungtae Lee et al.: "Fast Object Localization Using a CNN Feature Map Based Multi-Scale Search", arxiv.org, Cornell University Library, 201 Olin Library Cornell University Ithaca, NY 14853, Apr. 12, 2016, XP080695042, Section 3.2, Figure 3.
(Continued)

*Primary Examiner* — Dhaval V Patel
(74) *Attorney, Agent, or Firm* — Shun Yao; Park, Vaughan, Fleming & Dowler LLP

(57) ABSTRACT

Embodiments described herein provide a system for facilitating entity recognition. During operation, a camera associated with a computing device captures at least a first image of a to-be-recognized entity under a first imaging condition. The system adjusts the first imaging condition to achieve a second imaging condition, and the camera captures at least a second image under the second imaging condition. The system determines whether the to-be-recognized entity is a physical entity based on the captured first and second images and the first and second imaging conditions.

18 Claims, 10 Drawing Sheets

(51) Int. Cl.
*H04N 5/232* (2006.01)
*G06T 7/00* (2017.01)
*G06T 7/11* (2017.01)

(52) U.S. Cl.
CPC .................. *H04N 5/23299* (2018.08); *G06T 2207/10024* (2013.01); *G06T 2207/30201* (2013.01)

(58) Field of Classification Search
CPC ............. G06T 7/11; G06T 2207/10024; G06T 2207/30201
See application file for complete search history.

(56) References Cited

U.S. PATENT DOCUMENTS

| | | |
|---|---|---|
| 2001/0046659 A1 | 11/2001 | Oster |
| 2009/0206993 A1 | 8/2009 | Di Mambro |
| 2013/0015946 A1* | 1/2013 | Lau .................. G07C 9/00 340/5.2 |
| 2013/0208103 A1 | 8/2013 | Sands |
| 2014/0037184 A1 | 2/2014 | Gorski |
| 2014/0270411 A1 | 9/2014 | Shu |
| 2015/0110364 A1* | 4/2015 | Niinuma ............ G06K 9/00234 382/116 |
| 2015/0110366 A1 | 4/2015 | Sezille |
| 2015/0341370 A1 | 11/2015 | Khan |
| 2016/0034786 A1 | 2/2016 | Suri |
| 2016/0063235 A1 | 3/2016 | Tussy |
| 2016/0283787 A1 | 9/2016 | Nepomniachtchi |
| 2016/0307029 A1 | 10/2016 | Vaknin |
| 2017/0048244 A1 | 2/2017 | Loughlin-McHugh et al. |
| 2017/0060867 A1 | 3/2017 | Moutinho |
| 2017/0061563 A1 | 3/2017 | Falkenstern |
| 2018/0083973 A1 | 3/2018 | Paraskevas |

OTHER PUBLICATIONS

Zhou Huabing et al.: "Image Classification Based on Region of Interest Detection", Visual Communications and Image Processing; Jan. 20, 2004; San Jose; vol. 9813, Dec. 14, 2015, pp. 98130U-98130U, XP060063208, paragraph [0001]; figure 1.

* cited by examiner

SYSTEM AND METHOD FOR ENTITY RECOGNITION

RELATED APPLICATION

Under 35 U.S.C. § 119, this application claims the benefit and right of priority of Chinese Patent Application No. 201710909942.5, filed 29 Sep. 2017.

BACKGROUND

Field

This disclosure is generally related to the field of image recognition. More specifically, this disclosure is related to a system and method for determining whether the entity is a physical entity based on captured images of an entity.

Related Art

The proliferation of e-commerce and smartphones can allow users to conduct various types of business, such as opening a financial account or a mobile phone account, over their smartphones. Moreover, many financial institutions (e.g., banks) also allow their customers to conduct banking business, such as depositing checks, over their smartphones. Many of these business activities require a user to capture, using a camera installed on the smartphone, images of an original document, such as a government-issued identification (ID) card, a passport, or a check.

However, there remains the concern of fraud. For example, when required to prove his identity, instead of the real government-issued ID, a user may use the smartphone to capture the image of an electronic or paper copy of the government-issued ID. Such an electronic or paper copy can be illegally obtained (i.e., the user does not own the original ID) or have been edited (e.g., using photo-editing software). Similarly, when depositing a check, a fraudulent user may capture the image of an electronic or paper copy of the check, because he is not the real owner of the check.

In addition, many security-monitoring systems rely on captured images or video streams of an environment to detect abnormality or security risks. However, an adversary may use a counterfeit of a physical object or entity to deceive the security-monitoring system. Similarly, many services or applications may use facial-recognition techniques to authenticate legitimate users and to allow access. For example, a user-authentication system can capture a live image of the user's face and authenticate the user based on the captured image. There is also the possibility of fraud, because an attacker may use a two-dimensional (2D) image or 3-dimensional (3D) model of the user's face to gain access.

To prevent fraud, many service providers (e.g., financial service providers or security companies) have to rely on manual processes to verify the authenticity of the entity within the captured images (i.e., whether they are images of the real physical entity). Such manual processes can be costly and inefficient, often resulting in long waiting times for users using the services.

SUMMARY

Embodiments described herein provide a system for facilitating entity recognition. During operation, a camera associated with a computing device captures at least a first image of a to-be-recognized entity under a first imaging condition. The system adjusts the first imaging condition to achieve a second imaging condition, and the camera captures at least a second image of the to-be-recognized entity under the second imaging condition. The system determines whether the to-be-recognized entity is a physical entity based on the captured first and second images and the first and second imaging conditions.

In a variation on this embodiment, the system further extracts image features from the first and second images.

In a further variation, extracting image features from a respective image further comprises extracting a smaller image area containing the to-be-recognized entity and extracting one or more target recognition regions from the smaller image area.

In a further variation, the image features comprise one or more of: red-green-blue (RGB) values, grayscale values, and a size of the to-be-recognized entity appearing in the image.

In a variation on this embodiment, adjusting the first imaging condition comprises one or more of: adjusting a setting of the computing device, adjusting a setting of the camera, adjusting a posture of at least a portion of the to-be-recognized entity, adjusting a distance between the camera and the to-be-recognized entity, and adjusting a relative direction between the camera and the to-be-recognized entity.

In a further variation, adjusting the setting of the computing device comprises configuring a display of the computing device such that the display emits light with a predetermined intensity and color pattern, thereby achieving a desired illumination condition.

In a variation on this embodiment, determining whether the to-be-recognized entity is a physical entity comprises applying a machine-learning technique.

DETAILED DESCRIPTION

Figure 1:
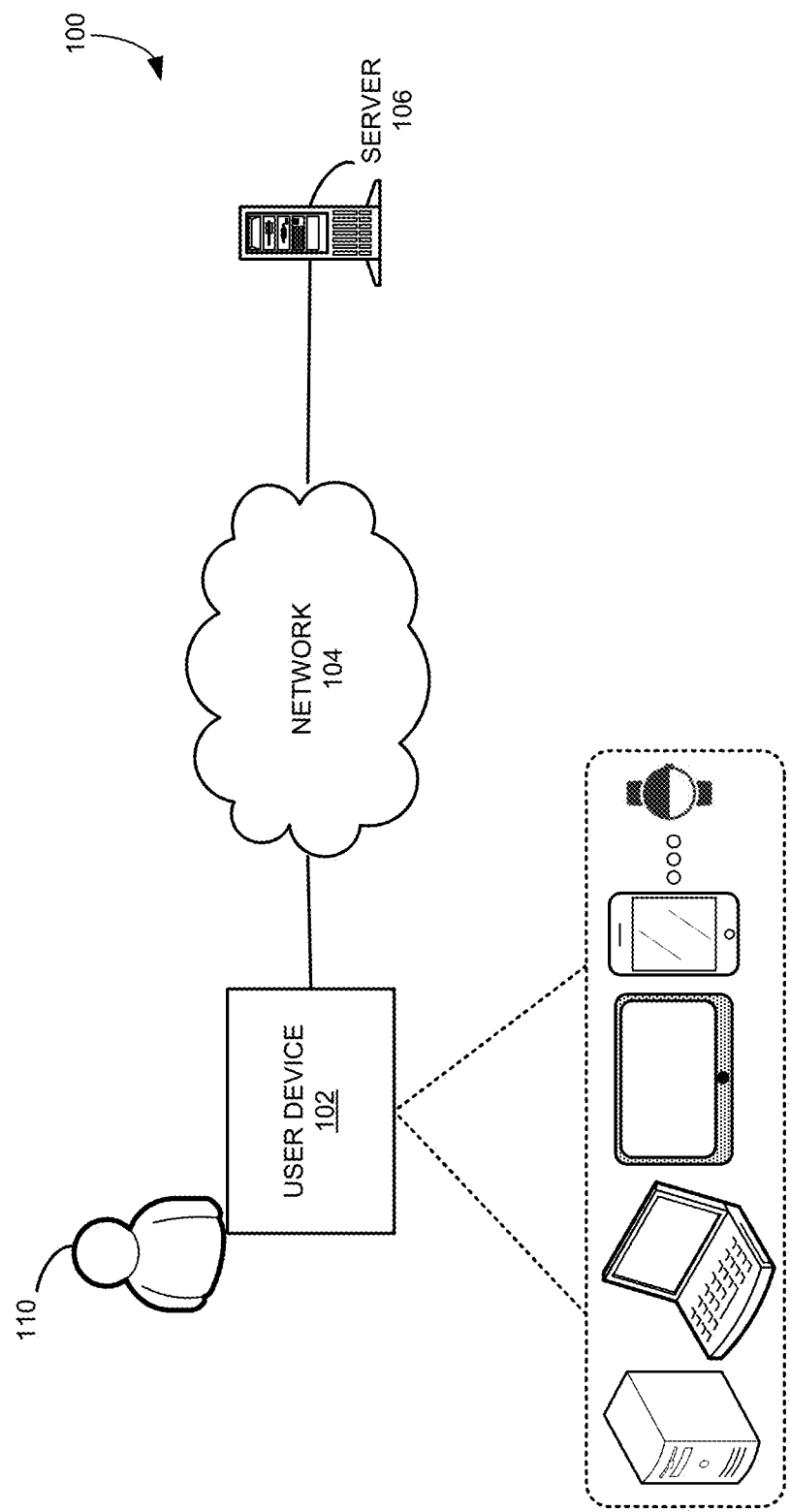
FIG. 1 shows an exemplary computing environment, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the technical problem of image-based entity recognition. More specifically, the novel entity-recognition solution can also be used for liveness detection, especially face liveness detection. During operation, a camera associated with a computing device (e.g., a mobile device) can capture a video of a human face. More specifically, while capturing the video, the computing device can also configure a light projector (e.g., the display of the computing device) to project light of a predetermined pattern (e.g., color, angle, and/or on-off frequency) onto the human face. Moreover, the camera can also change its direction and distance while capturing the video; and the computing device can also prompt the user to perform certain actions (e.g., opening his mouth or blinking his eyes) while the video is being captured. The entity-recognition system can then perform entity recognition or liveness detection based on the captured video. Because real human faces and human faces on a screen or photo have different light-reflection properties, or they can have different sizes or depths, the entity-recognition system can detect liveness or recognize entities based on comparisons of faces captured under different illumination conditions or at different angles/distances.

Entities typically can have specific compositions or forms, which are often associated with the environmental factors of the environment they are in. The compositions can include both physical and chemical compositions, and the forms can include the shapes and phases displayed by the entities. The same entity may exhibit different forms when exposed to different environmental factors, whereas different entities may exhibit different forms when exposed to the same environmental factors. Even when two different entities may exhibit similar forms when exposed to a particular set of environmental factors, they most likely will exhibit different forms when the environmental factors change. Hence, by carefully controlling the environmental factors to which an entity is exposed, an entity-recognition system can distinguish different entities. For example, a 3D model made of a particular material may exhibit one type of color or texture under visible light and a different type of color or texture under ultraviolet light, whereas a 3D model of the same shape but made of a different material may exhibit a similar color or texture under different lighting conditions.

To-be-recognized entities can include physical and non-physical entities. In this disclosure, physical entities can include artifacts, users (include users' faces), plants or animals, etc. Non-physical entities can include imitated or forged copies of physical entities, which can appear similar to the physical entities. For example, if a physical entity is a user (e.g., the user's face), its corresponding non-physical entity can include a photo or video of the user.

The imaging condition can indicate the environment where a to-be-recognized entity is, the formation or posture of the to-be-recognized entity, the operating status and settings of the image-capturing device, and the way the image-capturing device captures images of the to-be-recognized entity.

The image-capturing device can include a camera installed onto or coupled to a computing device, such as a webcam. Images used for entity recognition can include images (e.g., video images or pictures) of the to-be-recognized entity captured by the image-capturing device. In some embodiments, entity-recognition may be based on features of the images, and the features can include one or more of: color features, texture features, shape features, or spatial relationship features, etc.

Because a physical entity and its imitated or forged copy (also referred to as the corresponding non-physical entity), although similar, are two different entities, they can have different compositions and forms. As a result, under a certain imaging condition (e.g., when they are placed in an environment with target environmental factors or when the image-capturing device is capturing the images in a certain way), the physical entity and its corresponding non-physical entity can have different compositions or forms associated with such an imaging condition. Consequently, features of images captured under such an imaging condition for the physical entity and its corresponding non-physical entity can be different. Therefore, to distinguish between a physical entity and its corresponding non-physical entity, one can capture images (e.g., video images) of an entity under various imaging conditions and extract features from the captured images corresponding to the different imaging conditions. These extracted features can reflect the forms of the entity under the different imaging conditions. Therefore, an automated system can use the features to distinguish between physical entities and their corresponding non-physical entities, obviating the need for manual labor or experiences, thus significantly enhancing the accuracy and reliability of the entity-recognition process.

Embodiments of the present invention can be implemented as a client or a plug-in. A computing device can download the client or plug-in from a remote server and install such a client or plug-in. By running the client or plug-in, the computing device can perform the physical-entity recognition or authentication method. It is also possible for the program or plug-in to reside on the remote server, and the computing device can access the server to obtain the physical-entity recognition or authentication service.

The computing device for physical-entity recognition and authentication can include, but is not limited to: a smartphone, smartwatch, virtual-reality (VR) equipment, tablet computer, laptop computer, in-vehicle computer, desk top computer, set-top boxes, smart TV, wearable device, surveillance device, security-inspection device, etc. Such a computing device can include a camera for capturing images, can be coupled to a camera via a network in order to obtain captured images, or can receive images from other devices. The computing device can communicate with a remote server to obtain a client, plug-in, physical-entity recognition service, etc.

The client can include at least an application. The application can run on the computing device to perform the task of physical-entity recognition. The plug-in can be included in an application running on the computing device.

Physical-Entity Recognition

FIG. 1 shows an exemplary computing environment, according to one embodiment. Computing environment can include a user device 102, a network 104, and a server 106. A user 110 can use user device 102 to access an entity-recognition service. Examples of user device 102 can include, but are not limited to, a desktop, a laptop, a tablet, a smartphone, and a wearable device (e.g., a smartwatch). In some embodiments, user device 102 can either include or couple to a camera (not shown in FIG. 1), which can be used for capturing images of the to-be-recognized entity. In some embodiments, the entity-recognition service can be provided by user device 102. In further embodiments, the entity-recognition service can be provided by server 106, and user device 102 can couple to server 106 via network 104, which can be a local area network (LAN) or a wide area network (WAN) (e.g., the Internet).

In some embodiments, in order to recognize an entity or determine whether the entity is physical or non-physical, still or video images of the entity are captured. FIG. 2A shows an image-capturing setup. In FIG. 2A, a user 202 attempts to access a service via computing device (e.g., a tablet computer) 204. Such a service uses facial-recognition techniques for user authentication. To do so, user 202 can arrange a camera associated with computing device 204 such that his face can be in parallel to the camera. In situations where the camera is an internal camera of computing device 204, arranging the camera can involve arranging computing device 204. A video or multiple still images of user 202 can be captured by the camera.

Figure 2B:
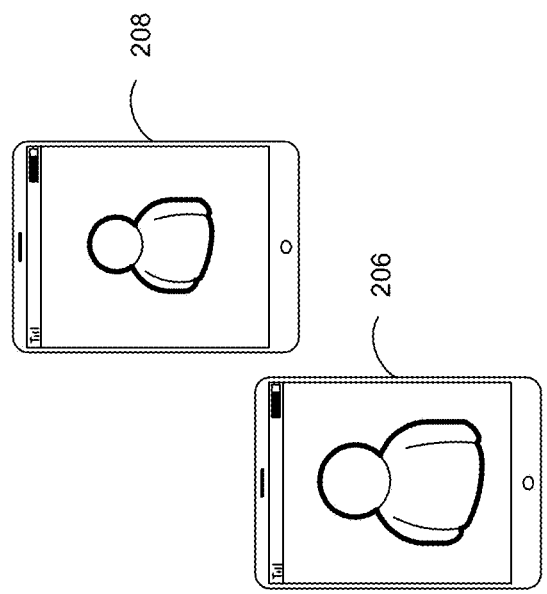
FIG. 2B shows a different image-capturing setup.
Figure 2A:
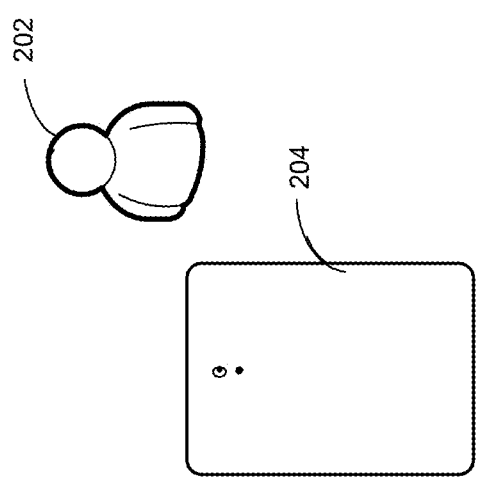
FIG. 2A shows an image-capturing setup.

FIG. 2B shows a different image-capturing setup. In FIG. 2B, a user attempts to access a service via computing device (e.g., a tablet computer) 206. To spoof the face-recognition application running on computing device 206, the user places a screen 208 (e.g., a computer screen) that displays an image of a real user in front of a camera associated with computing device 206. The user can then operate the camera in such a way that the camera captures images that only include the real user's face displayed on screen 208.

Traditional face-recognition approaches may not be able to distinguish between situations shown in FIG. 2A and FIG. 2B. To solve this problem, embodiments of the present invention rely on images captured under well-controlled imaging conditions to distinguish between a physical entity (e.g., the scenario shown in FIG. 2A) and a non-physical entity (e.g., the scenario shown in FIG. 2B).

Figure 3:
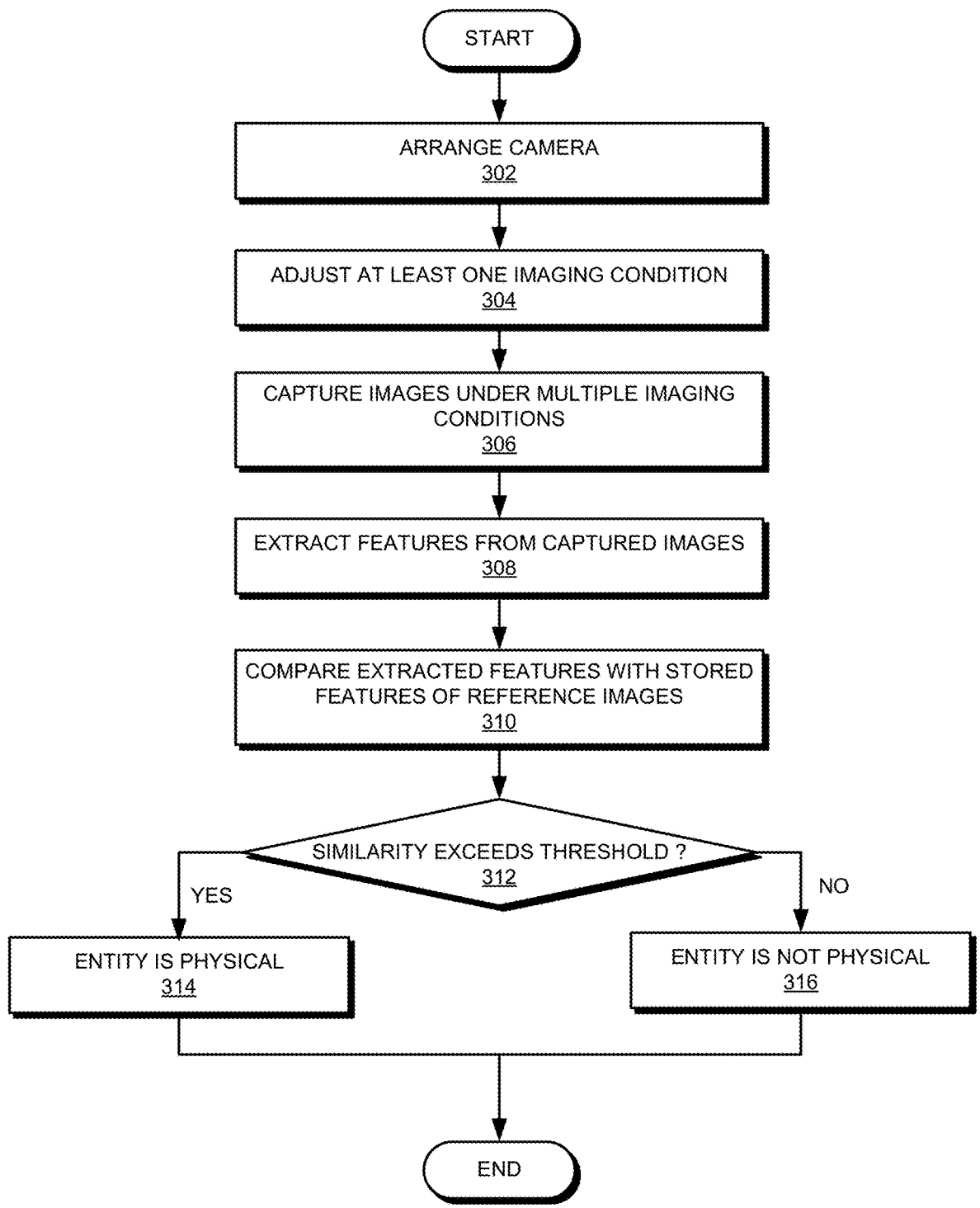
FIG. 3 presents a flowchart illustrating an exemplary process for recognizing an entity, according to one embodiment.

FIG. 3 illustrates an exemplary process for recognizing an entity, according to one embodiment. During operation, a camera associated with a computing device is arranged in such a way that it is ready to capture images of a to-be-recognized entity (operation 302). For example, for facial-recognition-based user authentication, a user may arrange a camera (e.g., an internal camera of a tablet computer or a webcam coupled to a laptop or desktop computer) in such a way that the camera can be ready to capture images of the user's face. Similarly, a fraudulent user trying to spoof the facial-recognition system may arrange the camera and a paper or electronic copy of the real user's face (e.g., a photograph of the real user's face or a computer screen displaying the real user's face) in such a way that the camera is ready to capture images of the displayed face of the real user.

Subsequently, the system adjusts at least one imaging condition (operation 304). Such adjustment may be performed manually by the user or may be an automated process. Note that, because entities typically can exhibit compositions or forms associated with imaging conditions, adjusting imaging conditions can be useful in recognizing entities, especially in distinguishing between physical entities and their counterfeits. The composition or form of a to-be-recognized entity associated with an imaging condition can often be reflected by features extracted from images captured under such an imaging condition. Hence, for accurate recognition of entities, the system can capture images of the to-be-recognized entity under different imaging conditions and compare those images. For example, when a lighting condition changes (e.g., when intensity or color of the light changes), image features of a physical entity (e.g., a real human's face) and its corresponding non-physical entity (e.g., an electronic copy of the human's face) can experience different changes. Therefore, it is possible to distinguish between the physical and non-physical entities by capturing their images under different lighting conditions.

In addition to intensity and color of the light, changing the lighting condition can also include changing the angle, range, or on-off frequency of the light. In addition to visible light, infrared, X-ray, or ultraviolet light can also be used to illuminate the to-be-recognized entity. In addition to lighting or illumination conditions, imaging conditions can also include temperature or humidity conditions. Sometimes changes in the lighting condition may also lead to changes in the temperature condition. In some embodiments, changing the imaging conditions may also include applying sound waves of different frequencies or intensities. Changing the imaging conditions can also include changing the operating status or parameters of the image-capturing device, such as the aperture size, the shutter speed, the resolution, the focal length, etc. Alternatively, changing the imaging conditions may involve changing the way the image-capturing device captures the images. For example, the image-capturing device can capture images using ultrasound or thermal waves, or it can capture images while the to-be-recognized entity changes its posture or formation (e.g., rotating around an axis).

The image-capturing device can capture images (e.g., video or still images) of the to-be-recognized entity under multiple imaging conditions (operation 306). Capturing images under different imaging conditions allows the system to identify the characteristics of the to-be-recognized object that are specific to the different imaging conditions. Note that high-quality images can allow the system to identify the characteristics of the to-be-recognized entity, thus leading to a more accurate entity-recognition result. In some embodiments, to mitigate the effect of poor image qualities leading to reduced image-recognition accuracy or reliability, the system may configure the image-capturing device in such a way that at least one image is taken under each imaging condition. For example, the camera can capture a still image under each imaging condition, or the camera can record a video while the imaging conditions are changing. If a video is recorded, the system can extract at least one frame that corresponds to each imaging condition. The captured still images or extracted video frames can then be used for entity-recognition.

The system can then extract features from the captured still images or video frames (operation 308). Features extracted from images captured under a particular imaging condition can reflect the form of the to-be-recognized entity specific to that particular imaging condition. For example, image features of a to-be-recognized entity specific to an imaging condition can include color, texture, or reflection properties. In some embodiments, the system can obtain a set of image features for each imaging condition.

Because physical and non-physical entities can have different characteristics under various imaging conditions, when the imaging condition changes, the forms exhibited by a physical entity and its corresponding non-physical entity can experience different changes. On the other hand, image features under different imaging conditions reflect the characteristics of an entity under those imaging conditions, and one can determine the characteristics of an entity based on its image features under the various imaging conditions. Therefore, it is possible to recognize whether an entity is physical based on image features of the entity associated with the various imaging conditions. For example, if the characteristics of a to-be-recognized entity under a number of imaging conditions are similar to those of a physical entity under the same imaging conditions, one can conclude that, as the imaging conditions change, the form of the to-be-recognized entity changes in a way similar to that of the physical entity. Consequently, the to-be-recognized entity can be recognized as the physical entity. In contrast, if the characteristics of the to-be-recognized entity under the various imaging conditions are different from those of the physical entity, the to-be-recognized entity can be recognized as a non-physical entity.

In some embodiments, the system can capture, beforehand, images of known physical entities under a number of imaging conditions, and extract and store image features specific to each known physical entity and imaging condition. The stored image features associated with known physical entities and predetermined imaging conditions can later be used as references for recognition of to-be-recognized entities. For example, the system can capture images of human faces under various imaging conditions (e.g., with or without flash), and extract and store image features of the human faces for each imaging condition. The stored image features can later be used to compare to image features of a to-be-recognized face in order to determine whether the to-be-recognized face is a face of a real human.

In some embodiments, subsequent to extracting image features associated with a number of imaging conditions, the system can compare the extracted image features to stored image features of a known physical entity (operation 310) and determine if a similarity level between the extracted image features and the stored image features exceeds a predetermined threshold (e.g., 75% or 80%) (operation 312). If so, the system determines that the to-be-recognized entity is a physical entity (operation 314). If not, the system determines that the to-be-recognized entity is a non-physical entity (operation 316). Note that, in the event of comparisons being made among images captured under multiple imaging conditions, estimating the similarity level can include an aggregation process where comparison of image features is done for each imaging condition and the comparison results can be aggregated for all imaging conditions. This way, even though a non-physical entity may appear similar to a physical entity in a certain imaging condition, the difference in image features in other imaging conditions can result in the aggregated similarity level being less than the threshold.

In the case of a to-be-recognized entity being a face, varying the imaging conditions can include varying the illumination conditions, or varying the relative direction and/or distance between the image-capturing device and the to-be-recognized entity. Note that the illumination conditions include wavelength, intensity, and direction of the light. For example, while capturing images of the face (which can be the face of real human or a face displayed on a computer screen), the system can adjust the illumination conditions by shining light of a particular wavelength and intensity on the face. Because the human skin and a computer screen can have different reflection properties, their images under the different illumination conditions can appear different. Moreover, different portions of a real human's face reflect light differently (e.g., some facial features may reflect light better than others), whereas a computer screen reflects light more uniformly. Hence, by comparing image features of different portions of the face, the system can also determine whether the face is a real human face or a face displayed on a computer screen.

Because there are significant differences in light-reflection properties between the inside of a human's mouth and other parts of a human's face, to facilitate recognition of a human face, in some embodiments, the system can prompt the user to open his mouth while an image-capturing device captures images of his face. Note that, although instructing users to perform certain actions has been used in liveness detection, such approaches cannot prevent fraudulent users from spoofing the system by using an animated 3D model of a human face. On the other hand, in embodiments of the present invention, the system not only requests the user to perform certain actions (e.g., opening his mouth or blinking his eyes) but also adjusts illumination conditions while the user is performing those actions, and captures images of the user's face under the various illumination conditions. Those captured images can then be used for more accurate liveness detection, because the system can determine if the captured images are of a physical or non-physical entity.

Figure 4:
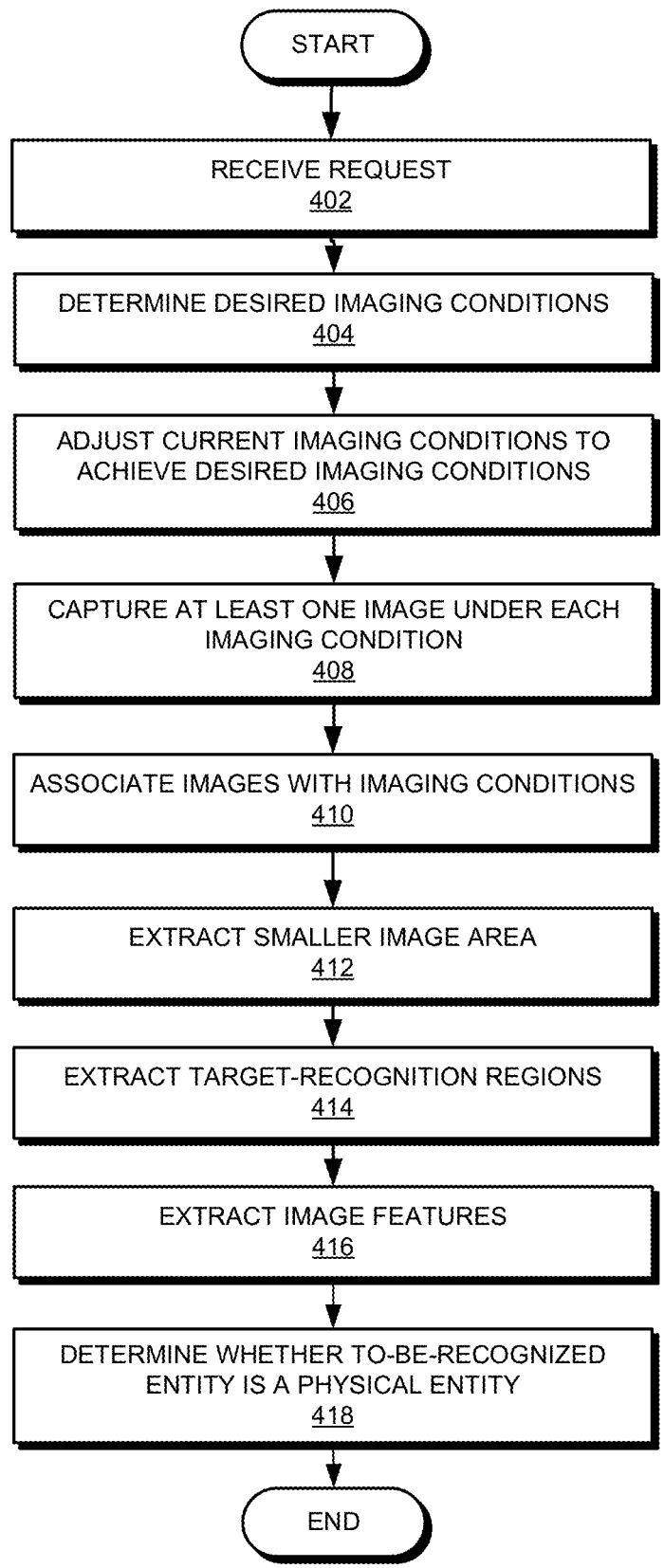
FIG. 4 presents a flowchart illustrating an exemplary process for recognizing an entity, according to one embodiment.

FIG. 4 illustrates an exemplary process for recognizing an entity, according to one embodiment. During operation, the system receives a request to recognize an entity (operation 402). In some embodiments, the to-be-recognized entity may be characterized. Based on the characterization of the to-be-recognized entity, the system can determine a set of desired imaging conditions (operation 404). In other words, the system can determine what kind of imaging condition is most likely to create images that can reflect the true properties of the to-be-recognized entities. As discussed previously, it is well-known that fraudulent users may use faces displayed on a screen to imitate human faces; and the faces on the screen will appear different from human faces under certain lighting conditions (e.g., when a strong flash is used when images are taken or when lights of different colors illuminate different portions of the face). Therefore, to distinguish between a real face and a face on screen, the system may determine that the desired imaging conditions can include various illumination conditions. On the other hand, if different portions of a to-be-recognized entity have different thermal capacities, meaning that the different portions may rise to different temperatures when heated, the system can determine that the desired imaging conditions can include temperature conditions. Alternatively, if the to-be-recognized entity reacts to a magnetic or electrical field, the desired imaging condition may include magnetic or electrical field strength and distribution.

Subsequently, the system adjusts current imaging conditions to achieve desired imaging conditions (operation 406). In some embodiments, the system can be equipped with various sensors (e.g., light sensors, temperature sensors, humidity sensors, pressure sensors, etc.) that can measure various environmental factors to which the to-be-recognized entity is exposed. If the measured environmental factors differ from what is required by the desired imaging conditions, the system can adjust the environmental factors until the desired imaging conditions are achieved. In some embodiments, adjusting the environmental factors can involve controlling various environmental control modules (e.g., a lighting system, a sound system, a heater, a cooling module, etc.). In some embodiments, if multiple desired imaging conditions (e.g., multiple temperature conditions) exist, the system can configure the environmental control modules in such a way that the multiple desired imaging conditions can be achieved sequentially while images or videos of the to-be-recognized object are captured.

Physical entities and their corresponding non-physical entities can exhibit different forms under different lighting conditions, when the distance and/or direction to the image-capturing device are different, or when the image-capturing device has different settings. For example, a physical entity can be a statue, and its corresponding non-physical entity can be images of the statue displayed on a computer screen. The physical entity is three-dimensional, whereas the non-physical entity is two-dimensional. Moreover, the physical and non-physical entities are made of two different materials. Hence, under different illumination conditions or when their distances to the image-capturing device are different, the physical and non-physical entities may exhibit different forms. In some embodiments, the desired imaging conditions may include one or more of: a desired illumination condition, the relative direction between the to-be-recognized entity and the image-capturing device, the relative distance between the to-be-recognized entity and the image-capturing device, and a desired setting of the image-capturing device. More specifically, the desired illumination condition can include one or more of: the angle, wavelength, and intensity of the light.

In some embodiments, in order to quickly and accurately adjust the imaging conditions, the system may adjust the equipment settings of the image-capturing device. For example, the system can control the flash, display, or other light-emission components on the image-capturing device in order to adjust the illumination conditions, including the light intensity, color, and angle. Moreover, the system can use an automated motion system (e.g., motor-driven propellers or wheels, conveyors, robotic arms, or a combination thereof) to move the light-capturing device in various directions (e.g., up and down, left and right, in and out, etc.) or according to a predetermined trajectory in order to change the relative distance and/or direction between the image-capturing device and the to-be-recognized entity. Alternatively, the system can prompt the user (e.g., text or audio prompts) to manually adjust the position of the image-capturing device. For example, if the image-capturing device is the camera on a smartphone, the system may prompt the user to move the smartphone in order to adjust the position of the camera.

Most images essentially are formed by light reflected off the to-be-recognized entity. Hence, to enhance the characteristics of the to-be-recognized entity under desired imaging conditions and to increase recognition accuracy, in some embodiments, the desired imaging conditions can also include a condition for ensuring that the captured image includes a special reflective region on the to-be-recognized entity. More particularly, the special reflective region can be a region on the to-be-recognized entity that is more reflective than other regions. For example, a region with a smoother surface can be considered a special reflective region. If the to-be-recognized entity is a human face, the special reflective region can be the inside of the mouth or the eyeballs. In such a scenario, achieving the desired imaging conditions can include prompting the user to open his mouth or eyes.

The system can capture at least an image under each desired imaging condition (operation 408). In some embodiments, operations 406 and 408 can be interwoven. In other words, the system may achieve a first imaging condition and take one or more images under the first imaging condition. The system can then adjust the imaging condition to achieve a second imaging condition and take one or more images under the second imaging condition. These operations can be repeated until all desired imaging conditions have been achieved and images have been captured for each desired imaging condition.

The system can associate the image or images captured under each imaging condition with that particular imaging condition (operation 410). This operation can prevent an image captured under one imaging condition from being wrongfully associated with a different imaging condition and, hence, can enhance the accuracy and reliability of the entity recognition. In some embodiments, the system can create a label for each image immediately after the image is captured, with the label indicating the imaging condition. Alternatively, the system can separately store images captured under different imaging conditions; or the system can keep a record of the correlation relationship between captured images and imaging conditions, thus enabling correct association between an image and its corresponding imaging condition.

In some embodiments, the system may record the time each image is captured and then associate the image with an imaging condition based on the recorded time. For example, the system can record the association between the imaging conditions and the times when those imaging conditions are in effect. Therefore, based on the capture time of an image, the system can correctly associate an image and the imaging condition under which the image was captured. In the event where the imaging conditions include at least one of: the relative direction and the relative distance between the image-capturing device and the to-be-recognized entity, the system can determine such imaging conditions using one or more motion sensors (e.g., accelerometers or gyroscopes) installed on the image-capturing device. Alternatively, such imaging conditions can be obtained via manual measurement.

Subsequently, the system can extract, from each captured image, a smaller area containing or corresponding to the to-be-recognized entity (operation 412). In addition to the to-be-recognized entity, a captured image can often include other entities or objects that can be part of the background, and these background entities can often interfere with the entity-recognition process. To simplify the entity-recognition process, the system can reduce the captured image to a smaller image area that contains only or mostly the to-be-recognized entity. The system can either label or crop such a reduced image area. In some embodiments, the system can apply a previously trained machine-learning model (e.g., a deep-learning neural network) on captured images to identify a portion of the image that contains only or mostly the to-be-recognized entity. For example, if the to-be-recognized entity is a human face, the machine-learning model can be trained using images containing human faces in order to detect human faces. The system can then label or crop detected human faces from captured images.

The system can further extract, from the reduced image area that contains only or mostly the to-be-recognized entity, one or more target-recognition regions or points (operation 414). Some entities may include certain special features that can distinguish them from other entities. For example, facial features (e.g., eyes or mouth) can be used to distinguish a human face from other types of entity. Similarly, leaves or pedals of a plant or antlers of an animal are also special features that can be used to distinguish the plant or animal from other types of entity. Hence, by concentrating entity-recognition efforts on those special features, the system can further increase the efficiency and accuracy of entity recognition.

In some embodiments, the system can predetermine what kind of special features should be included in the extracted target-recognition regions. For example, if the to-be-recognized entity is a human, the target-recognition regions can include the human face, or they can include one or more of: the mouth region, the nostril region, regions adjacent to the nose ridge, eyes, cheeks, and the inside of the mouth. In further embodiments, the system can apply a previously trained machine-learning model to identify and extract the target-recognition regions from the originally captured or previously reduced image. The system can label or crop the image to obtain the target-recognition regions that may contain only or mostly the special features that can distinguish the to-be-recognized entity from other entities. Training of the machine-learning model can involve using images of known physical entities with labeled target-recognition regions. Note that, in some embodiments, the machine-learning model can directly extract target-recognition regions from original images without the need to reduce those images. In other words, operation 412 can be optional.

Subsequent to extracting the target-recognition regions, the system can extract image features from the target-recognition regions corresponding to the imaging conditions (operation 416) and determine whether the to-be-recognized entity is a physical entity based on the extracted image features and their corresponding imaging conditions (operation 418).

The color, brightness, or texture of the to-be-recognized entity appearing in captured images can often indicate the reflection property of an entity, and such a reflection property of a physical entity can often be different from that of a non-physical entity, especially under certain illumination conditions. More specifically, the color, brightness, or texture of the to-be-recognized entity in an image captured under a particular imaging condition reflects the entity's reflection property under such imaging condition. Therefore, if the imaging condition includes an illumination condition and the relative distance and/or direction of the image-capturing device, the extracted image features can include the color values, the grayscale values, or both. More specifically, the color values can include the RGB values. For example, under strong illumination (e.g., when the camera's flash is turned on), images captured of a computer screen often include bright spots, which indicate the reflection property of a screen, not a human face.

Moreover, although a physical entity and its counterfeit may appear similar, such a similarity can be limited. In many scenarios, a physical entity and its counterfeit may present different forms when viewed from different angles. For example, a physical entity and a 2D image of the physical entity displayed on a screen may appear similar when viewed from the front. However, one cannot obtain a side image of the 2D image displayed on the screen. In some embodiments, if the imaging condition includes the relative direction between the image-capturing device and the to-be-recognized entity, the extracted image features can include the orientation or attitude angle of the to-be-recognized entity appearing in the image. More specifically, the attitude angle can include pitch and roll angles. In some embodiments, the system can apply a previously trained machine-learning model to recognize the attitude angle of a to-be-recognized entity in a captured image. Training of the machine-learning model can involve using images of known physical entities having different attitude angles. Moreover, the system can obtain the attitude angle of the to-be-recognized entity in the image based on other factors, such as the distribution of recognizable special features of the entity. For example, if the to-be-recognized entity is a human face, the distribution of facial features or a triangle formed by the eyes and nose can be used to infer the attitude angle of the face. In some embodiments, the system can also determine the physical size of the to-be-recognized entity by changing the distance between the image-capturing device and the entity and capturing images under different distances.

Similar to the example shown in FIG. 3, in some embodiments, the system may determine whether a to-be-recognized entity is a physical entity by comparing extracted image features with stored image features of reference images. More particularly, for each imaging condition, the system may compare image features extracted from images captured under the imaging condition with previously stored image features of a physical entity specific to the imaging condition. Depending on the imaging condition, the previously stored image features can include one or more of: the attitude angle, size of the entity in the image, color values, and grayscale values. If the image features extracted from the captured images are similar to those of the previously stored image features of a physical entity under the same imaging condition, the system can determine that the to-be-recognized entity is a physical entity; otherwise, the system can determine that the to-be-recognized entity is a non-physical entity. Note that, because a physical entity and its counterfeit may have similar features under certain imaging conditions but not all imaging conditions, the comparison of the image features needs to be performed for each and every imaging condition. As long as a difference in image features is detected for one imaging condition, the system can determine that the to-be-recognized entity is a non-physical entity. For example, a real human face and a human face on a screen may appear similar if their images are taken under normal lighting conditions (e.g., sunlight or room light). However, they can appear very different when their images are taken under strong directional light (e.g., under strong flashes). Hence, to determine whether a face is a real human face or a face displayed on a screen, the system needs to compare images captured under a set of different illumination conditions with stored images of a real human face under the same set of illumination conditions.

Alternatively, in some embodiments, a previously trained machine-learning model (e.g., a support vector machine (SVM) or a deep-learning neural network) can determine, based on the extracted image features and their corresponding imaging conditions, whether a to-be-recognized entity is a physical entity. The machine-learning model can be trained using images of known physical entities and non-physical entities captured under a set of known imaging conditions. More specifically, the system can extract image features from those images and use the extracted image features to train the machine-learning model. Note that, as discussed previously, extracting image features can also involve usage of a different machine-learning model, which can be trained using the same sample images.

As discussed previously, by adjusting the distance between the image-capturing device and the to-be-recognized entity and capturing images for each distance, the system can infer the size of the to-be-recognized entity. The inferred size can be used to determine whether the to-be-recognized entity is a physical entity because the physical entity and its counterfeit often have different sizes. For example, a real human face and a face displayed on a computer screen can have different sizes and a car model and a real car can have different sizes. The ability to infer sizes (including sizes in different dimensions) can enhance the entity-recognition accuracy of the system.

Figure 5:
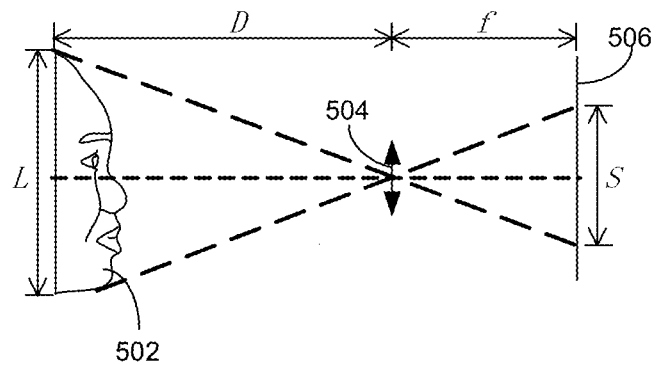
FIG. 5 shows the operation principle of inferring the physical size of an entity, according to one embodiment.
Figure 5:
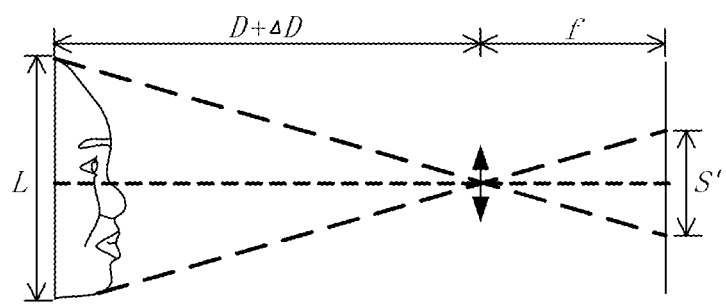

Most image-capturing devices rely on the pinhole imaging principle for image capturing: the ratio between the width or length of an entity and its imaging width or length (i.e., its width or length appearing in an image) can be proportional to the ratio between the imaging distance (i.e., the distance between the entity and the image-capturing device) and the image-capturing device's focal length. The image-capturing device's focal length is known. Hence, by adjusting the imaging distance and by measuring the imaging width or length, one can infer the width or length of the entity. FIG. 5 shows the operation principle of inferring the physical size of an entity, according to one embodiment. In FIG. 5, the to-be-recognized entity can be a face 502 and the image-capturing device can be a camera equipped on a smartphone. The size (e.g., the height) of the face can be denoted L, and the focal length of the camera (i.e., the distance between camera lens 504 and imaging plane 506) can be denoted f. When the distance between the smartphone and the face is D, the imaging size of the face is S, as shown in the top drawing of FIG. 5. The proportional relationship among the different variables can be written as: $L/D=S/f$. On the other hand, when the imaging distance increases by $\Delta D$, the imaging size of the face becomes S', as shown in the bottom drawing of FIG. 5. The proportional relationship among the different variables can then be written as: $L/(D+\Delta D)=S'/f$. Therefore, based on these two proportional relationships, one can deduce $L=S'\Delta D/[(1-S'/S)f]$. This means that when the image-capturing device has a fixed focal length, one can deduce the size of an entity by varying its distance to the image-capturing device. Considering the measurement uncertainties, in some embodiments, the system can compare the inferred size of a to-be-recognized entity with the true size of a known physical entity. If the difference between the inferred size and the true size is within a predetermined range (i.e., less than 10% of the true size), the system can determine that the size of the to-be-recognized entity is similar to the true size of the physical entity. Such information can be helpful in determining whether the to-be-recognized entity is a physical entity. On the other hand, if the size difference exceeds the predetermined range (i.e., more than 10% of the true size), the system can determine that the size of the to-be-recognized entity is different from the true size of the physical entity and, hence, the to-be-recognized entity is less likely to be a physical entity.

Instead of inferring the size of a to-be-recognized entity, in some embodiments, the system can predict the imaging size of a physical entity based on the ratio between the imaging distance and the focal length. The system can then compare the imaging size of the to-be-recognized entity and the predicted imaging size in order to determine whether the to-be-recognized entity is a physical entity. In such a scenario, the imaging size of the to-be-recognized entity can be part of extracted image features. Other types of extracted image features can include one or more of: color values, grayscale values, and attitude angles. In addition to the imaging size, the system can also predict other types of image features of a physical entity under various imaging conditions, and then compare image features extracted from images of a to-be-recognized entity captured under the same imaging conditions to the predicted image features in order to determine whether the to-be-recognized entity is a physical entity.

Figure 6:
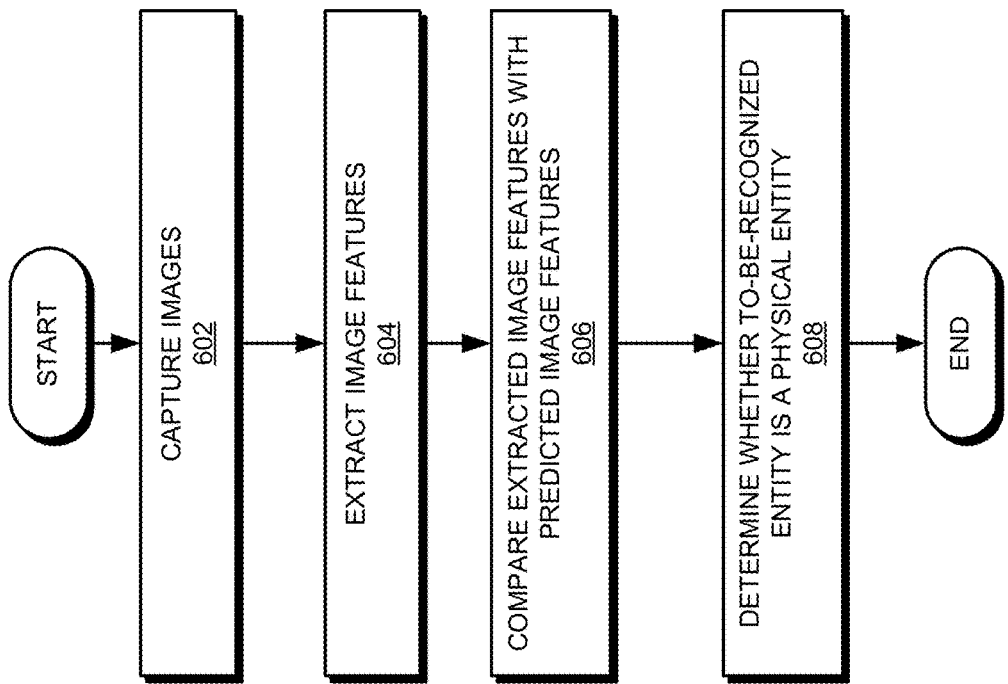
FIG. 6 presents a flowchart illustrating an exemplary process for recognizing an entity, according to one embodiment.

FIG. 6 illustrates an exemplary process for recognizing an entity, according to one embodiment. During operation, the system can capture images of a to-be-recognized entity under a set of predetermined imaging conditions (operation 602). The images can include still images or videos. The system can then extract, from captured images, image features corresponding to the set of predetermined imaging conditions (operation 604). More specifically, the system can extract image features corresponding to each predetermined imaging condition. For each predetermined imaging condition, the system can compare the extracted image features with the predicted image features of a corresponding physical entity (operation 606) and determines whether the to-be-recognized entity is a physical entity based on the comparison outcome (operation 608). If, for each and every predetermined imaging condition, the extracted image features (e.g., one or more of: color values, grayscale values, attitude angles, and imaging size) are similar to the predicted image features, the system can determine that the to-be-recognized entity is a physical entity. On the other hand, if a mismatch is detected under any imaging condition, the system can determine that the to-be-recognized entity is a non-physical entity.

In some embodiments, instead of comparing image features extracted from captured images to stored or predicted image features, the system can track the changes in image features when the imaging condition changes. Because the forms of a physical entity and its counterfeit may experience different changes when the imaging condition changes, detecting or tracking the changes in the image features can facilitate entity recognition.

Figure 7:
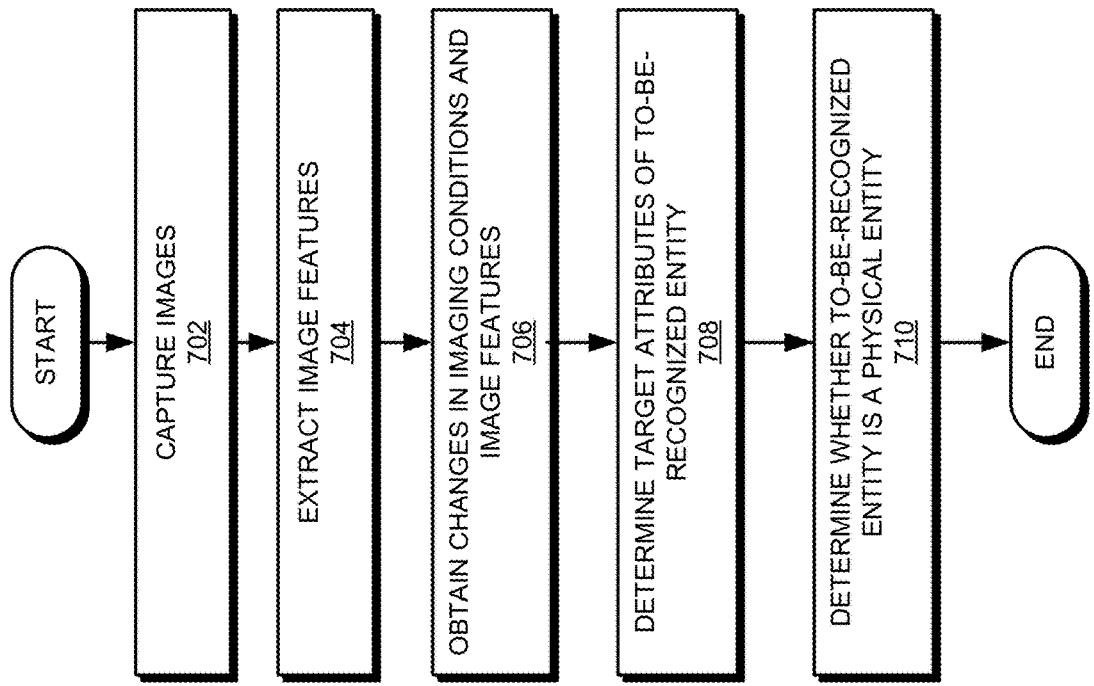
FIG. 7 presents a flowchart illustrating an exemplary process for recognizing an entity, according to one embodiment.

FIG. 7 illustrates an exemplary process for recognizing an entity, according to one embodiment. During operation, the system can capture images of a to-be-recognized entity under a set of predetermined imaging conditions (operation 702) and extract, from captured images, image features corresponding to the set of predetermined imaging conditions (operation 704). Subsequently, the system can obtain changes in at least two consecutive imaging conditions and changes in image features of images captured under the consecutive imaging conditions (operation 706). For example, changes in imaging conditions can include changes in intensity of light projected onto the to-be-recognized entity during image capturing, and changes in image features can include changes in brightness of certain special reflective regions of the images of the to-be-recognized entity. Based on changes in imaging conditions and changes in image features, the system can determine target attributes of the to-be-recognized entity (operation 708) and determines whether the to-be-recognized entity is a physical entity based on the target attributes (operation 710). Note that the target attributes are physical attributes of the to-be-recognized entity and are independent of imaging conditions.

A physical entity and its counterfeit can exhibit different forms under different imaging conditions. The different forms can be indicated by the different image features. Moreover, as the imaging conditions change, they can experience different changes in their forms, reflected by different amounts of changes in their image features. By tracking the changes in the image features, one can identify one or more target attributes of the to-be-recognized entity, and those target attributes can indicate the special characteristics of a to-be-recognized entity. For example, features of an image of a to-be-recognized entity can include the imaging size of the to-be-recognized entity, and a target attribute of the to-be-recognized entity can be its physical size. As discussed previously, by changing the imaging distance, the system can determine the physical size (which can be a target attribute) of the to-be-recognized entity based on the imaging size and the change in the imaging size (which can be part of the image features).

In addition to physical size, attributes that can be used for recognizing an entity can include, but are not limited to: surface texture, color, color values, grayscale values, reflection properties, existence or location of special reflective regions, etc. Depending on the imaging conditions and available image features, the system can determine certain target attributes. For example, if the imaging conditions include illumination conditions and available image features include color values, the target attributes can include surface texture and color of the to-be-recognized entity. Similarly, if the imaging conditions include prompting the user to adjust his posture to making facial movements to show a special reflective region (e.g., prompting the user to open his mouth) and the available image features include the color values of the special reflective region, the target attributes can then include the existence or location of such a special reflective region.

Figure 8:
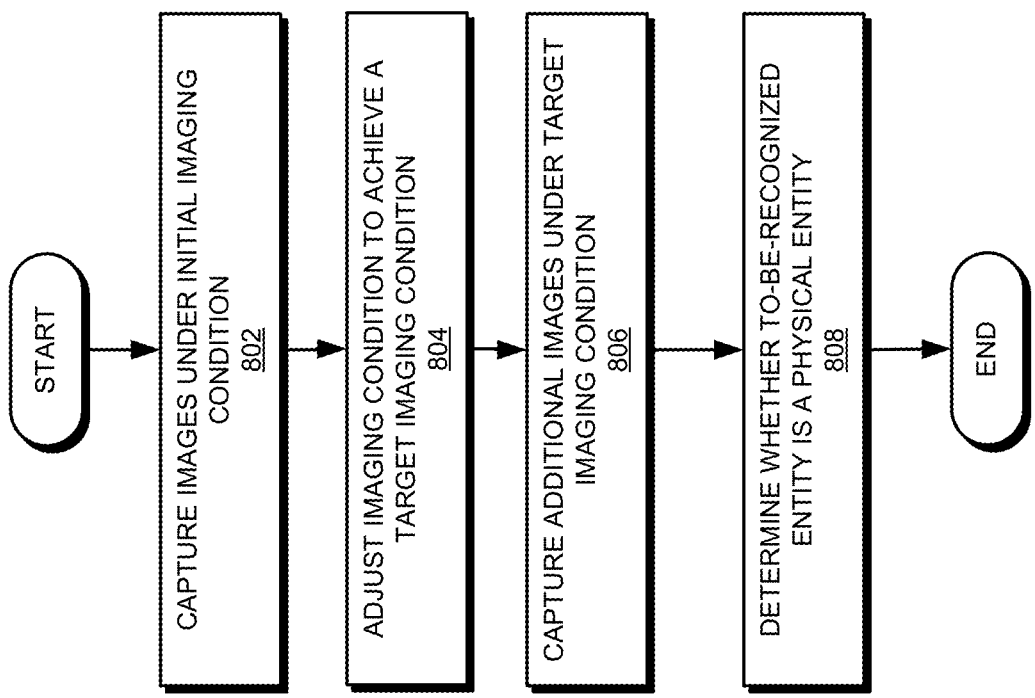
FIG. 8 presents a flowchart illustrating an exemplary process for recognizing an entity, according to one embodiment.

FIG. 8 illustrates an exemplary process for recognizing an entity, according to one embodiment. During operation, the system can capture one or more images of a to-be-recognized entity under an initial imaging condition (operation 802). This initial imaging condition can be the natural condition that the to-be-recognized entity is in. Subsequently, the system can adjust the imaging condition to achieve a target imaging condition (operation 804). Adjusting the imaging condition can involve adjusting the illumination condition, adjusting the position and/or distance of the image-capturing device, or adjusting the posture of the to-be-recognized entity. In the event of the entity being a face, adjusting the posture can involve prompting the user to perform certain facial movements (e.g., opening eyes or mouth). Subsequent to adjusting the imaging condition, the system can capture additional images under the target imaging condition (operation 806). The system can then determine, based on images captured before and after the adjustment to the imaging condition, whether the to-be-recognized entity is a physical entity (operation 808).

In some embodiments, the system can extract relevant features from images captured before and after the adjustment to the imaging conditions and apply a machine-learning classifier (i.e., a SVM or a deep-learning neural network) on the extracted features in order to determine whether the to-be-recognized entity is a physical entity. In such a scenario, the machine-learning classifier has been previously trained using image features of known physical entities associated with known imaging conditions. Alternatively, the system may apply the machine-learning classifier directly on images captured before and after the adjustment to the imaging condition. Such a classifier can be trained using images of known physical entities captured under known imaging conditions.

Figure 9:
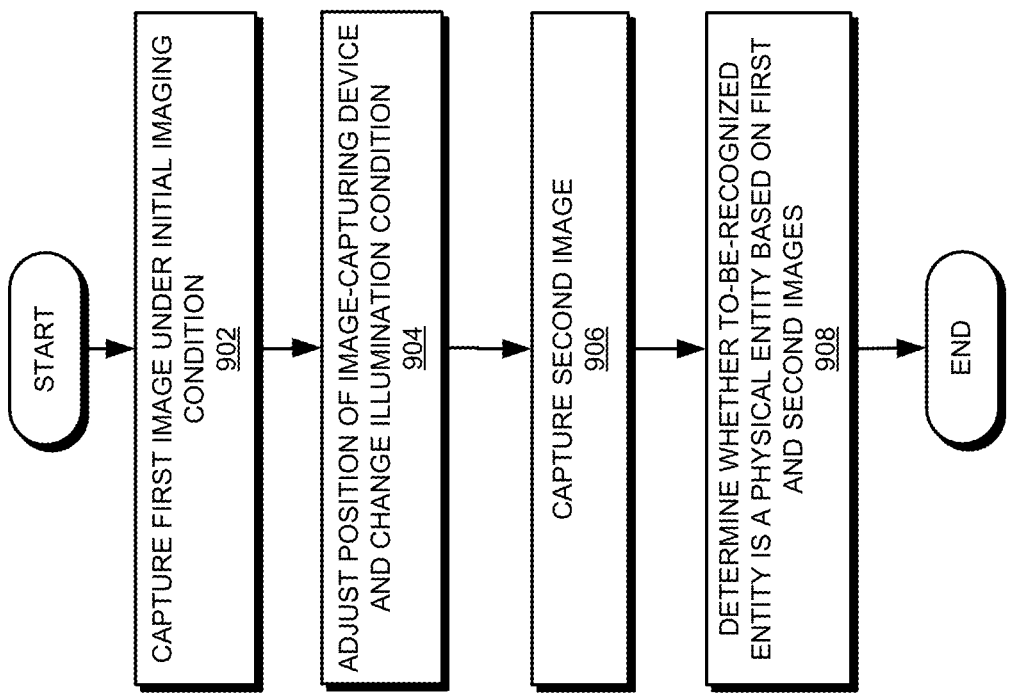
FIG. 9 presents a flowchart illustrating an exemplary process for recognizing an entity, according to one embodiment.

FIG. 9 illustrates an exemplary process for recognizing an entity, according to one embodiment. During operation, the system can capture a first image of a to-be-recognized entity under an initial imaging condition (operation 902). The initial imaging condition can include the current illumination condition and the current relative direction and/or distance between the to-be-recognized entity and the image-capturing device. Subsequently, the system can adjust the position of the image-capturing device and change the illumination condition (operation 904). In some embodiments, the system can adjust the position of the image-capturing device automatically. For example, the system can use certain automated mechanisms, such as robotic arms or conveyors, to move the image-capturing device to a desired new location. More specifically, the system may move the image-capturing device left and right, up and down, in and out, or in a circular motion. Alternatively, the system may prompt the user to manually move the image-capturing device. For example, if the image-capturing device is the camera equipped on a smartphone, the system may prompt the user using audio or text signals to adjust the position of the smartphone. The user can move the smartphone left and right, up and down, in and out, or in a circular motion. Similarly, the system may adjust the illumination condition automatically or prompt the user to do so manually. Using the smartphone as an example, the system may automatically turn on the flash of the smartphone or prompt the user to turn on the flash manually. Alternatively, the system may use the smartphone display as a light source and automatically adjust the intensity, color, or both of light emitted by the display. In further embodiments, the system may configure the display of the smartphone to display a pattern (e.g., by adjusting the light intensity and/or color of different regions on the display). Such a pattern can be used to illuminate the to-be-recognized entity during image capturing. In some embodiments, the smartphone may pre-store a number of display patterns. During operation, depending on the position of the smartphone relative to the to-be-recognized entity (e.g., the face of the user), the smartphone may display different patterns. In other words, the illumination condition can be associated with the relative position of the image-capturing device.

Subsequently, the system can capture a second image of the to-be-recognized entity (operation 906). The system can then determine whether the to-be-recognized entity is a physical entity based on the captured first and second images (operation 908). As discussed previously, the system can apply a machine-learning classifier directly on first and second images or on image features extracted from the first and second images.

As discussed previously, a physical entity and its counterfeit can have different forms under different imaging conditions, thus exhibiting different characteristics. The system can adjust the imaging condition and capture first and second images before and after the adjustment to the imaging condition. Image features extracted from the first and second images can reflect the forms of the to-be-recognized entity before and after the adjustment of the imaging condition. Hence, by comparing forms of the to-be-recognized entity before and after the adjustment to the imaging condition to the forms of the physical entity before and after the adjustment to the imaging condition, respectively, the system can determine whether the to-be-recognized entity is a physical entity. If the forms match for both before and after the adjustment to the imaging condition, the system can determine that the to-be-recognized entity is a physical entity. Otherwise, the system can determine that the to-be-recognized entity is a non-physical entity.

Liveness Detection

The physical-entity recognition ability provided by embodiments of the present invention can also be used for liveness detection, which can be part of a user-authentication process. For example, many user-authentication systems rely on face-recognition technology to recognize a user's face in order to authenticate a user. More specifically, when a user attempts to access a remote service via his smartphone, the system may configure the camera equipped on the smartphone to capture a live image of the user's face in order to authenticate the user. However, a fraudulent user may spoof such a user-authentication system using 2D or 3D models of the real user. By detecting the liveness of the face, the authentication system can prevent such fraud.

Figure 10:
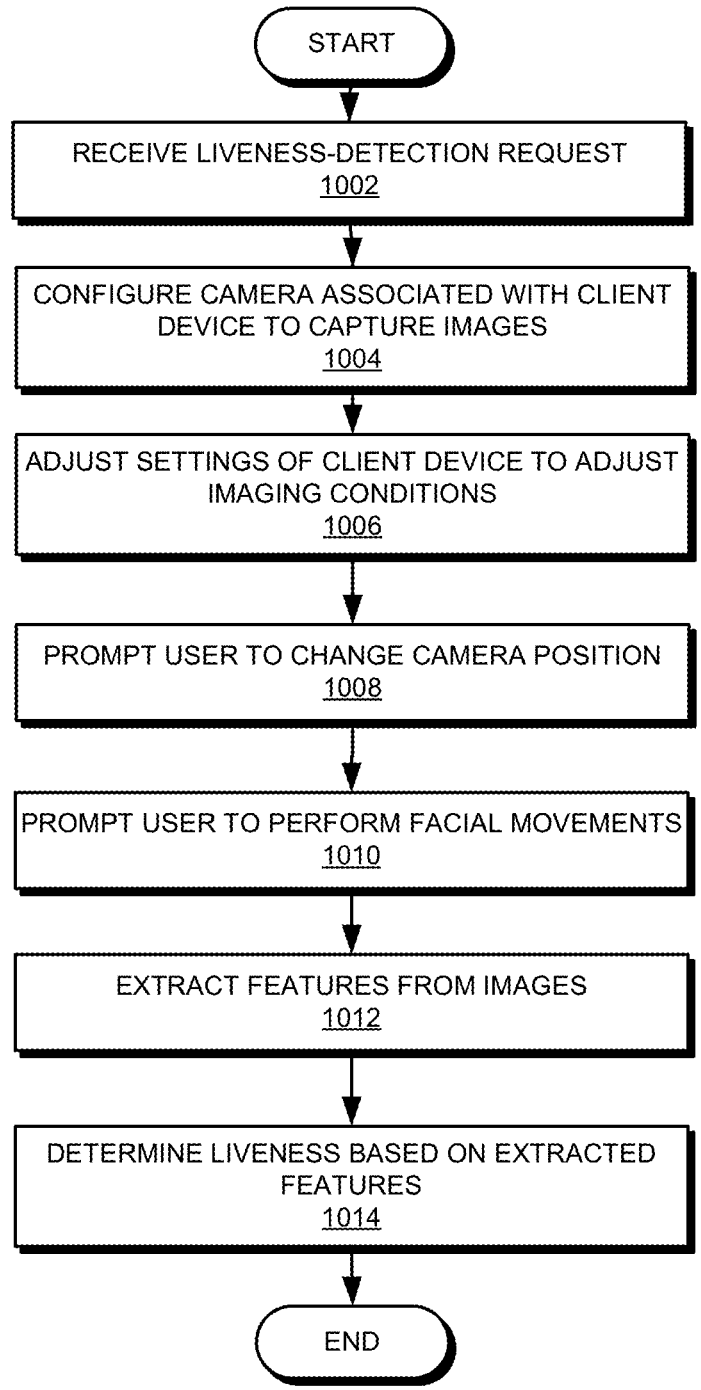
FIG. 10 presents a flowchart illustrating an exemplary liveness-detection process, according to one embodiment.

FIG. 10 shows an exemplary liveness-detection process, according to one embodiment. During operation, a system can receive a liveness-detection request (operation 1002). Note that liveness detection can be a sub-operation in a user-authentication process. For example, a user may wish to access, via a client device (e.g., a smartphone), a service provided by a server. To authenticate the user, the system needs to perform liveness-detection on the user. In response to the liveness-detection request, the system can configure a camera associated with the client device to capture one or more images of the user (operation 1004). In the event of the client device being a smartphone equipped with a front-facing camera, the system may configure the smartphone in such a way that the front-facing camera captures one or more images of the user, more particularly the user's face. The system may also need to prompt the user, via audio or text signals, to place the smartphone at an appropriate location such that the camera on the smartphone can capture images of the user's face. In one embodiment, the system may configure the smartphone to start capturing a video of the user's face.

While the video of the user's face is being captured, the system can adjust the imaging conditions by adjusting various settings of the client device (operation 1006). For example, the system can adjust the brightness of at least a portion of the display of the smartphone in order to adjust the illumination condition. Moreover, the system can adjust the color or color pattern displayed by the display of the smartphone. In some embodiments, the brightness or color pattern of the smartphone display can be adjusted in a time-varying fashion. For example, the brightness of the display can change periodically or the displayed color or color pattern can vary with time. Alternatively, the system can configure the flash or flashlight of the smartphone. For example, the system can continuously turn on the flashlight or turn it on and off periodically. When illumination conditions change with time, the system records the illumination condition for each time instant. In other words, the system can record the brightness, color, or color pattern of the display and the on-off condition of the flash for each time instant.

In addition to adjusting the illumination conditions, the system may prompt the user, via audio or text signals, to adjust the position of the camera and/or the client device (operation 1008). Note that when the camera is built into the client device (e.g., a smartphone), movements of the client device can result in concurrent movements of the camera. When the client device moves, the display of the client device moves accordingly. Because the display has been configured to provide lighting, the illumination direction changes as the position of the display changes. For example, when the user moves the smartphone (e.g., up and down, left and right, in and out, or in a circular motion), the light projected by the smartphone display may illuminate the user's face from different angles, thus creating different illumination conditions. In some embodiments, as the user moves the smartphone, the system can record, via various motion sensors equipped on the smartphone (e.g., accelerometer or gyroscope) positions and/or orientations of the smartphone at each time instant. Such information can be used during subsequent image-processing operations.

Moreover, the system can also prompt the user, via audio or text signals, to perform certain facial movements (e.g., opening mouth or blinking eyes) (operation 1010). Prompting the user to open the mouth or blink the eyes allows the system to capture images containing the inside of the mouth or the eyeballs. Because the inside of the mouth or the eyeballs can have significantly different reflection properties compared to other portions of the face, images containing such facial features can facilitate the system to determine whether the user's face is genuine. Moreover, these images can be captured under various illumination conditions. The variation of reflection of the inside of the mouth or eyeballs under different illumination conditions can further facilitate the system in determining whether the user's face is genuine.

Note that operations 1004-1010 can be performed simultaneously, meaning that as the camera is capturing images (e.g., video images) of the user, the light projected by the display can change intensity, color, distance, and direction. Moreover, the user can perform certain facial movements while the camera is capturing images and while the lighting conditions change. The system records the lighting conditions and prompts to the user as a function of time. In some embodiments, the camera can capture images for a predetermined time (e.g., a few seconds).

The system can then extract features relevant for liveness detection from the captured images (operation 1012). More specifically, the system can detect and track the user's face from each image (or each frame within the captured video), and locate key facial features or face landmarks on the user's face. The system can then define a number of image blocks on the face, which can include the whole face, lips, the mouth cavity, areas adjacent to the nose ridge, nostrils, eyes, cheeks, etc. Each image block can include a number of pixels. In some embodiments, extracting the features can involve calculating, for each image, the RGB values or grayscale values of the individual image block. Based on the detected facial features (e.g., the relative distance and/or direction among the facial features), the system can calculate the attitude angle of the face in each image. Moreover, the system can associate each image, thus the face in each image, with a corresponding imaging condition, such as the position of the smartphone display and the light intensity and/or color pattern of the display. More specifically, each image can be timestamped when it is captured, and the system can determine the instant imaging condition based on the timestamp.

Subsequently, the system can determine liveness based on the extracted features (operation 1014). In other words, the system can determine, based on features of images captured in various imaging conditions, whether the face in these images is from a real human. In some embodiments, determining liveness can involve applying a machine-learning classifier (e.g., a SVM or a deep-learning neural network) on the extracted features. More specifically, the system can compare features extracted from images taken at various times to predicted image features of a human face. Because image or images taken at a particular time correspond to a particular imaging condition, the system can use predicted image features corresponding to such imaging conditions for comparison. The predicated image features associated with an imaging condition are features extracted from images of known human faces taken under that imaging condition. In other words, given an imaging condition, the system can predict the image features of a physical entity, such as a human face. In some embodiments, after extracting image features (e.g., the RGB or grayscale values of one or more previously defined image blocks on the face, the attitude angle of the face, and/or the image size of the face) from a particular image taken under an imaging condition (e.g., the lighting condition provided by the display or flash, the position of the smartphone, etc.), the system can determine whether the extracted image features match the predicted image features corresponding to the same imaging condition. If so, the system can determine that the to-be-recognized face is the face of a real human. Because the RGB or grayscale values of the captured images can reflect the reflection properties of the to-be-recognized face, if the RGB or grayscale values match the predicted values, the system can determine that the surface reflection properties of the to-be-recognized face are similar to those of real human skin. Moreover, the system can calculate the physical size of the face based on images of the face captured at different distances. Hence, by comparing the calculated physical size to the size of a real face, the system can also determine whether the to-be-recognized face is a real human face. In contrast, a face displayed on a computer screen is most likely to have different reflection properties and size than a real human face.

After confirming that the face in the captured images is a real human face, the system can authenticate the user using known face-recognition techniques. In some embodiments, the liveness-detection process shown in FIG. 10 can be performed solely by the client machine. Alternatively, the client machine may transmit the captured images and their corresponding imaging conditions to a server, which then processes the images to determine whether the to-be-recognized entity is a physical entity.

Exemplary Computer System and Apparatus

Figure 11:
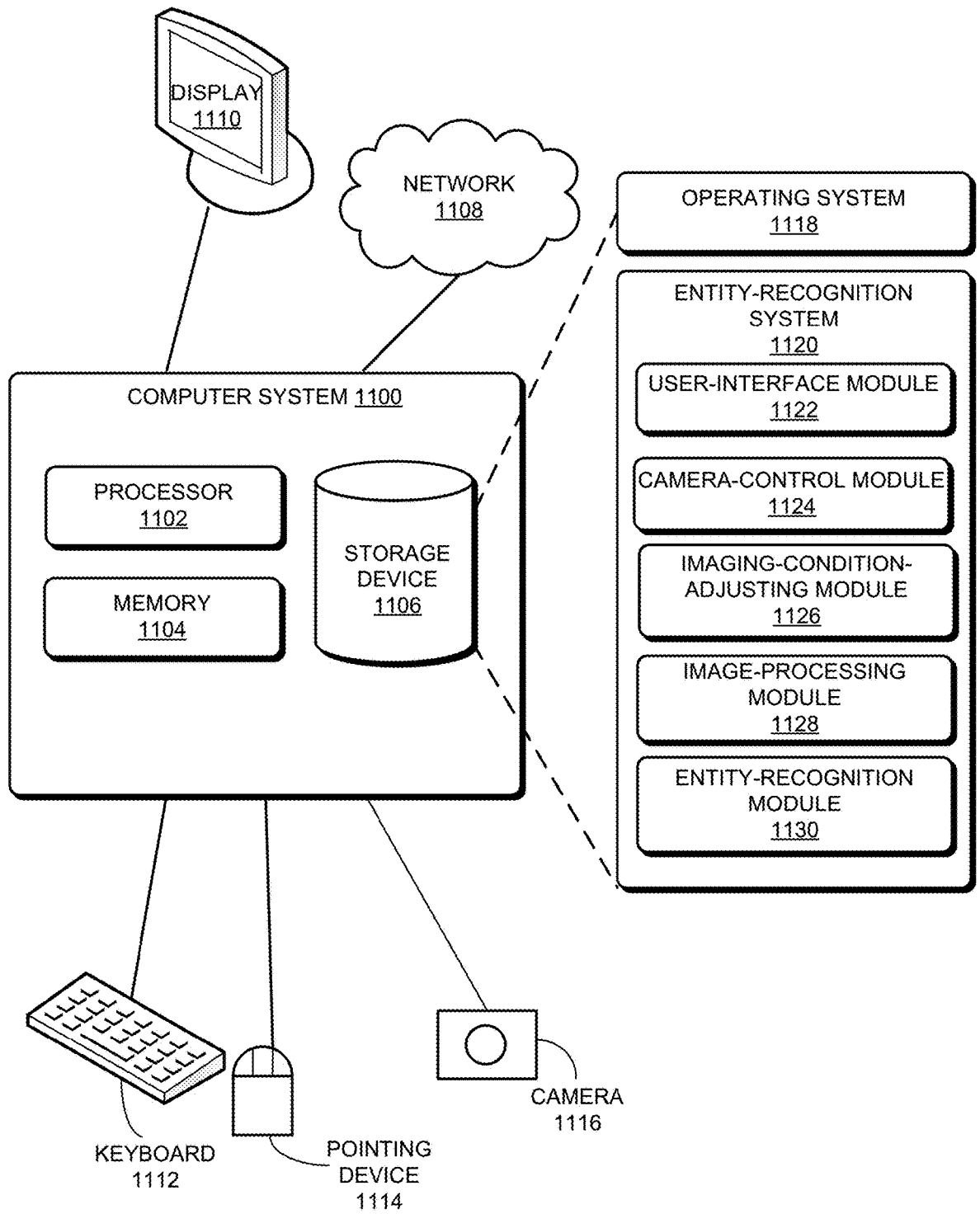
FIG. 11 illustrates an exemplary computer system that facilitates an entity-recognition system, according to one embodiment.

FIG. 11 illustrates an exemplary computer system that facilitates an entity-recognition system, according to one embodiment. Computer system 1100 includes a processor 1102, a memory 1104, and a storage device 1106. Computer system 1100 can be coupled to a display device 1110, a keyboard 1112, a pointing device 1114, and a camera 1116, and can also be coupled via one or more network interfaces to network 1108. Storage device 1106 can store an operating system 1118, and an entity-recognition system 1120.

Entity-recognition system 1120 can include instructions, which when executed by computer system 1100 can cause computer system 1100 to perform methods and/or processes described in this disclosure. Specifically, entity-recognition system 1120 can include instructions for displaying a user interface (user-interface module 1122). Through the user interface, entity-recognition system 1120 can prompt the user to perform various actions for adjusting imaging conditions. Entity-recognition system 1120 can also include instructions for controlling the camera to capture images of the to-be-recognized entity (camera-control module 1124) and instructions for adjusting imaging conditions (imaging-condition-adjusting module 1126). Furthermore, entity-recognition system 1120 can include instructions for processing the captured images (image-processing module 1128) and instructions for recognizing the to-be-recognized entity (entity-recognition module 1130). Image-processing module 1128 can perform various image-processing operations such as feature extraction. More specifically, image-processing module 1128 and entity-recognition module 1130 can also include one or more machine-learning modules.

Figure 12:
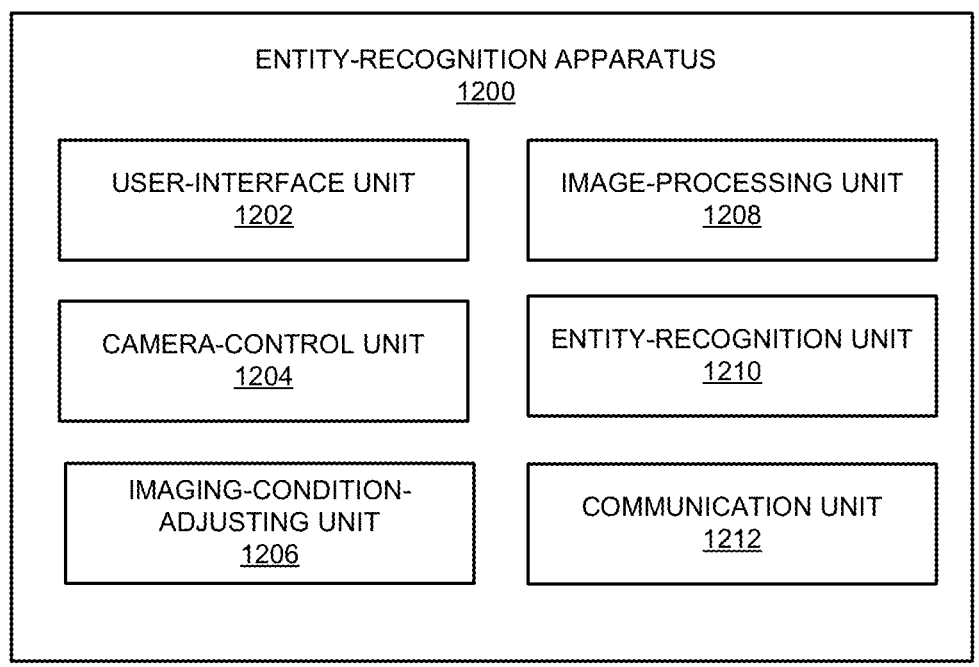
FIG. 12 illustrates an exemplary apparatus that facilitates an entity-recognition system, according to one embodiment.

FIG. 12 illustrates an exemplary apparatus that facilitates an entity-recognition system, according to one embodiment. Apparatus 1200 can comprise a plurality of units or apparatuses that may communicate with one another via a wired, wireless, quantum light, or electrical communication channel. Apparatus 1200 may be realized using one or more integrated circuits, and may include fewer or more units or apparatuses than those shown in FIG. 12. Further, apparatus 1200 may be integrated in a computer system, or realized as a separate device that is capable of communicating with other computer systems and/or devices. Specifically, apparatus 1200 can comprise units 1202-1210, which perform functions or operations similar to modules 1122-1130 of computer system 1100 of FIG. 11, including: a user-interface unit 1202, a camera-control unit 1204, an imaging-condition-adjusting unit 1206, an image-processing unit 1208, and an entity-recognition unit 1210. Apparatus 1200 can further include a communication unit 1212.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for entity recognition, the method comprising:
   capturing, by a camera associated with a computing device, at least a first image of a to-be-recognized entity under a first imaging condition;
   adjusting the first imaging condition to achieve a second imaging condition;
   capturing at least a second image of the to-be-recognized entity under the second imaging condition; and
   determining whether the to-be-recognized entity is a physical entity based on the captured first and second images and the first and second imaging conditions, which comprises:
      extracting first and second sets of image features from the first and second images, respectively;

determining a change between the first and second imaging conditions;

determining a change between the first and second sets of image features;

determining one or more imaging-condition-independent target attributes associated with the to-be-recognized entity based on the change between the first and second imaging conditions and the change between the first and second sets of image features; and determining whether the to-be-recognized entity is a physical entity based on the determined imaging-condition-independent target attributes.

2. The method of claim 1, wherein extracting image features from a respective image further comprises:
extracting a smaller image area containing the to-be-recognized entity; and
extracting one or more target recognition regions from the smaller image area.

3. The method of claim 1, wherein a respective set of image features comprise one or more of:
red-green-blue (RGB) values;
grayscale values; and
a size of the to-be-recognized entity appearing in the image.

4. The method of claim 1, wherein adjusting the first imaging condition comprises one or more of:
adjusting a setting of the computing device;
adjusting a setting of the camera;
adjusting a posture of at least a portion of the to-be-recognized entity;
adjusting a distance between the camera and the to-be-recognized entity; and
adjusting a relative direction between the camera and the to-be-recognized entity.

5. The method of claim 4, wherein adjusting the setting of the computing device comprises configuring a display of the computing device such that the display emits light with a predetermined intensity and color pattern, thereby achieving a desired illumination condition.

6. The method of claim 1, wherein determining whether the to-be-recognized entity is a physical entity comprises applying a machine-learning technique.

7. A computer-implemented method for liveness detection of a user, the method comprising:
in response to receiving, by a computing device, a request for detecting liveness of the user, capturing, by a camera associated with the computing device, at least a first image of the user under a first imaging condition;
adjusting a setting of the computing device to achieve a second imaging condition;
capturing at least a second image of the user under the second imaging condition; and
determining liveness of the user based on the captured first and second images and the first and second imaging conditions, which comprises:
extracting first and second sets of image features from the first and second images, respectively;
determining a change between the first and second imaging conditions;
determining a change between the first and second sets of image features;
determining one or more imaging-condition-independent target attributes associated with the user based on the change between the first and second imaging conditions and the change between the first and second sets of image features; and
determining the liveness of the user based on the determined imaging-condition-independent target attributes.

8. The method of claim 7, wherein adjusting a setting of the computing device comprises configuring a display of the computing device such that the display emits light with a predetermined intensity and color pattern, thereby achieving a desired illumination condition.

9. The method of claim 7, further comprising:
prompting the user to adjust positions of the computing device;
recording the positions of the computing device based on readings of one or more sensors equipped on the computing device; and
associating the positions of the computing device with images of the user captured by the camera.

10. The method of claim 9, wherein the camera is equipped on the computing device, wherein adjusting the positions of the computing device comprises adjusting distances between the camera and the user, and wherein the method further comprises estimating a physical size of the user's face based on the distances between the camera and the user and size of the user's face appearing in captured images.

11. The method of claim 7, further comprising:
prompting the user to move at least one facial feature; and
capturing images of the user before and after the user moves the at least one facial feature.

12. The method of claim 7, wherein determining liveness of the user comprises applying a machine-learning technique.

13. A computer system, comprising:
a processor; and
a storage device coupled to the processor and storing instructions, which when executed by the processor cause the processor to perform a method for entity recognition, the method comprising:
capturing, by a camera associated with a computing device, at least a first image of a to-be-recognized entity under a first imaging condition;
adjusting the first imaging condition to achieve a second imaging condition;
capturing at least a second image of the to-be-recognized entity under the second imaging condition; and
determining whether the to-be-recognized entity is a physical entity based on the captured first and second images and the first and second imaging conditions, which comprises:
extracting first and second sets of image features from the first and second images, respectively;
determining a change between the first and second imaging conditions;
determining a change between the first and second sets of image features;
determining one or more imaging-condition-independent target attributes associated with the to-be-recognized entity based on the change between the first and second imaging conditions and the change between the first and second sets of image features; and
determining whether the to-be-recognized entity is a physical entity based on the determined imaging-condition-independent target attributes.

14. The computer system of claim 13, wherein extracting image features from a respective image further comprises:
extracting a smaller image area containing the to-be-recognized entity; and extracting one or more target recognition regions from the smaller image area.

15. The computer system of claim 13, wherein a respective set of image features comprise one or more of:
   red-green-blue (RGB) values;
   grayscale values; and
   a size of the to-be-recognized entity appearing in the image.

16. The computer system of claim 13, wherein adjusting the first imaging condition comprises one or more of:
   adjusting a setting of the computing device;
   adjusting a setting of the camera;
   adjusting a posture of at least a portion of the to-be-recognized entity;
   adjusting a distance between the camera and the to-be-recognized entity; and
   adjusting a relative direction between the camera and the to-be-recognized entity.

17. The computer system of claim 16, wherein adjusting the setting of the computing device comprises configuring a display of the computing device such that the display emits light with a predetermined intensity and color pattern, thereby achieving a desired illumination condition.

18. The computer system of claim 13, wherein determining whether the to-be-recognized entity is a physical entity comprises applying a machine-learning technique.

* * * * *